United States Patent

Seif

(10) Patent No.: US 9,096,173 B2
(45) Date of Patent: Aug. 4, 2015

(54) CONTROL CIRCUIT FOR A DUAL-FUNCTION SIGNALING OR LIGHTING DEVICE AND CORRESPONDING CONTROL METHOD

(75) Inventor: Lothar Seif, Nailly (FR)

(73) Assignee: Valeo Vision, Bobigny (FR)

( * ) Notice: Subject to any disclaimer, the term of this patent is extended or adjusted under 35 U.S.C. 154(b) by 570 days.

(21) Appl. No.: 13/187,641

(22) Filed: Jul. 21, 2011

(65) Prior Publication Data

US 2013/0020938 A1 Jan. 24, 2013

(30) Foreign Application Priority Data

Jul. 21, 2011 (FR) ...................................... 11 56601

(51) Int. Cl.
B60Q 1/14 (2006.01)
B60Q 1/26 (2006.01)
B60Q 11/00 (2006.01)
H05B 33/08 (2006.01)

(52) U.S. Cl.
CPC .............. *B60Q 1/2607* (2013.01); *B60Q 11/00* (2013.01); *H05B 33/0851* (2013.01); *H05B 33/0827* (2013.01)

(58) Field of Classification Search
USPC ........... 315/76, 77, 82, 185 R, 219, 294, 299; 307/10.1, 10.8
See application file for complete search history.

(56) References Cited

U.S. PATENT DOCUMENTS

| 6,371,636 | B1 | 4/2002 | Wesson |
| 6,414,437 | B1 | 7/2002 | Diez et al. |
| 6,819,051 | B1 * | 11/2004 | Currie .............................. 315/82 |
| 6,853,150 | B2 * | 2/2005 | Clauberg et al. ........... 315/185 R |
| 7,291,989 | B2 * | 11/2007 | Namba et al. .................. 315/291 |
| 7,902,758 | B2 * | 3/2011 | Woodward et al. .............. 315/82 |
| 2003/0025465 | A1 * | 2/2003 | Swanson et al. ............... 315/291 |
| 2004/0075393 | A1 * | 4/2004 | Ito et al. ........................... 315/77 |
| 2006/0061466 | A1 | 3/2006 | Garcia Briz |
| 2010/0066249 | A1 | 3/2010 | Nagafuchi et al. |
| 2011/0001432 | A1 * | 1/2011 | Chung et al. ................... 315/152 |

FOREIGN PATENT DOCUMENTS

| EP | 1087642 A2 | 3/2001 |
| GB | 2418244 A | 3/2006 |

* cited by examiner

*Primary Examiner* — Thuy Vinh Tran
(74) *Attorney, Agent, or Firm* — Jacox, Meckstroth & Jenkins

(57) ABSTRACT

An electrical control circuit for a lighting and/or signaling module handling at least two functions from one and the same network of light sources of LED type. The function selection is handled by one or more input signals on the monitoring unit. If a branch or section connected to a defective LED fails, the monitoring unit can either deactivate all the branches or sections, or keep the remaining branches or sections active, and do so according to the function that is present. One or more functions can thus be compared to the single-section type despite the presence of a number of sections when the monitoring unit is configured to deactivate all the sections if one of the sections fails.

13 Claims, 3 Drawing Sheets

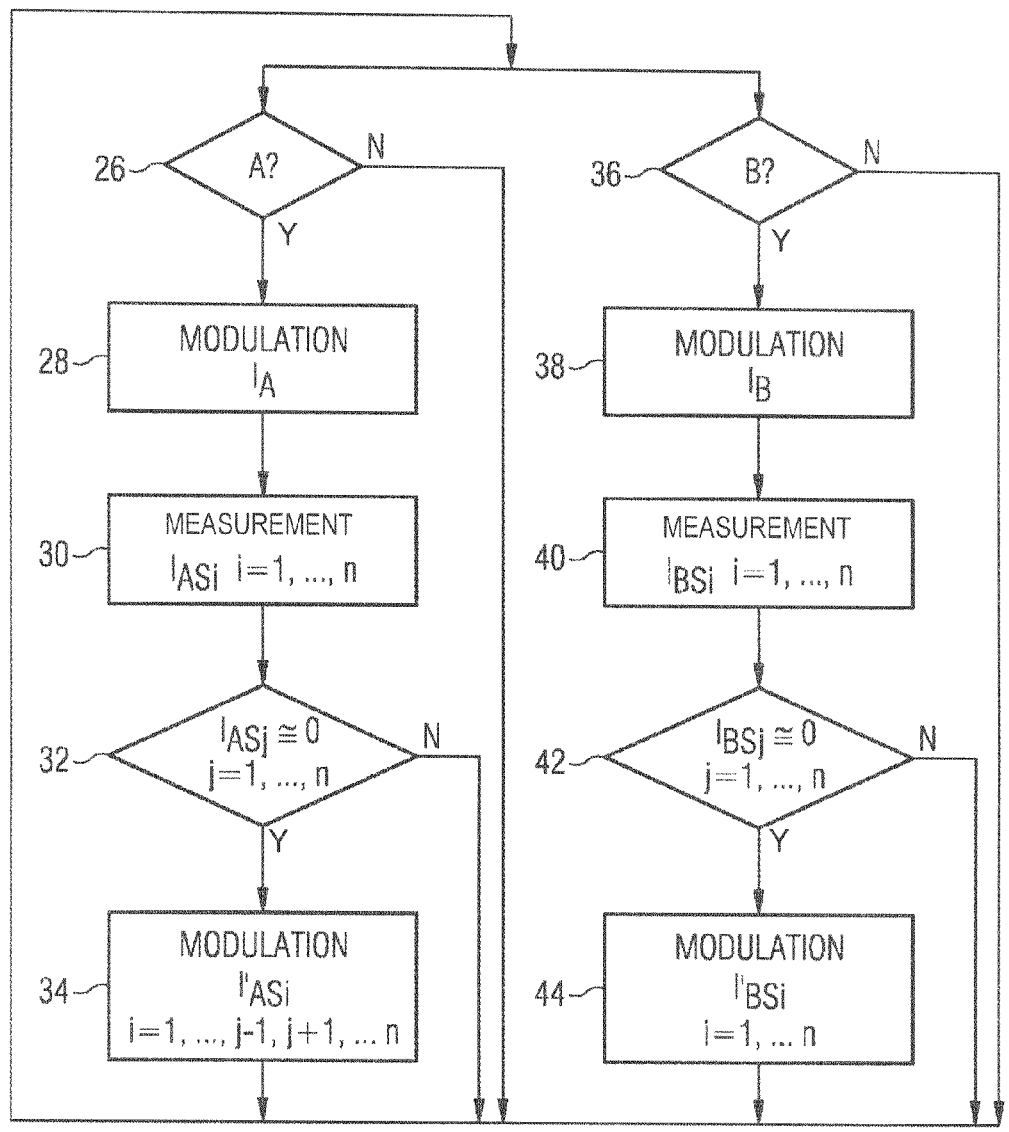

CONTROL CIRCUIT FOR A DUAL-FUNCTION SIGNALING OR LIGHTING DEVICE AND CORRESPONDING CONTROL METHOD

CROSS-REFERENCE TO RELATED APPLICATIONS

This application claims priority to French Application No. 1156601 filed Jul. 21, 2011, which application is incorporated herein by reference and made a part hereof.

BACKGROUND OF THE INVENTION

1. Field of the Invention

The invention deals with a control and power supply circuit for a signaling and/or lighting module, in particular for a motor vehicle. More particularly, the invention deals with such a control circuit for a signaling and/or lighting module handling at least two signaling and/or lighting functions from the same light sources. The invention also deals with a signaling and/or lighting module equipped with the circuit concerned. The invention also deals with the method of implementation by the control circuit and a microcontroller implementing the method.

2. Description of the Related Art

The use of one and the same group of light sources, in particular of light-emitting diode (LED) type, to handle at least two lighting functions is known in particular from the U.S. Patent Publication No. 2010/0066249 A1. In this teaching, a group of nine LEDs arranged according to a 3 by 3 matrix is powered selectively by two distinct power supplies, one corresponding to the "brake" function and the other corresponding to the "side light" (rear signaling light) function. The power supply corresponding to the "brake" function provides a lighting level greater than that of the "side light" function. In fact, the power supply for the "side light" function supplies a lower current because of the presence of an additional resistor.

The LEDs arranged in a matrix form three parallel branches, but with connections between the branches at each level. This type of connection means that, if one LED fails, the remaining LEDs of the corresponding branch will still be powered and will participate in the signaling. However, given that the current passing through these remaining LEDs will come from the LEDs of the higher level or levels of the other branches, the result will be a non-uniformity in the lighting power between the LEDs. Such a non-uniformity is not desirable for various reasons, in particular aesthetic and failure detection reasons. As it happens, the failure detection is particularly difficult because only the intensity of the current passing through all the LEDs can be monitored and the consumption difference should a single LED fail out of a group of nine means that there is a particular demand when it comes to measurement accuracy.

Furthermore, the brightness of the LEDs requires, in order to be monitored, a current whose intensity remains constant regardless of the input voltage. Their power supply is therefore significantly more complex than the power supplies for incandescent lamps, which simply have to be connected to a battery. In practice, the relationship which links the power supply voltage and current of the emissive semiconductors (the LEDs) is not linear. Thus, a small increase in voltage applied to the LED may lead to a significant increase in the current and therefore to a the emitted light flux. The LEDs display a characteristic curve in direct voltage mode similar to that of the diodes. Below their switching threshold, or approximately 3.5 V for a white LED, very little current passes through them. On the other hand, above this threshold, as the direct voltage increases, the flow of the current increases exponentially. In the case of an LED power supply through an external resistor in series with the voltage source, if the power supply voltage increases by a little, the direct current passing through the LED is modified very substantially and the emission performance of the LED which is approximately proportional to the current which passes through it evolves accordingly. The series resistor must therefore be adjusted for each LED accordingly. This adjustment is valid only for a given temperature range and it is essential to take account of the thermal environment for the definition of the series resistor, or even have the latter evolved in temperature for the case of an extended temperature range. Furthermore, too great an increase in the power supply voltage for the LEDs through a resistor will result in an excessive current flow that may damage the component.

Furthermore, the chromatic coordinates of the white LEDs vary according to the power supply current passing through them. Thus, if a number of LEDs are driven in parallel (i.e., driven in voltage mode), the current which passes through each LED is different because of the intrinsic disparity between components associated with the technology and there may be significant differences in chromatic coordinates between each LED which are shown by the emitted whites having different colored aspects.

Backfitting a signaling device such as that of the teaching described above may pose problems in that one and the same electric circuit has to allow for two functions in order to satisfy the regulatory conditions. Indeed, the power ratio between the "brake" function and the "side light" function is fairly high, generally greater than a factor of 10. Furthermore, the regulation demands not only minimum lighting values but also maximum values.

SUMMARY OF THE INVENTION

The aim of the invention is to overcome at least one of the abovementioned drawbacks. More particularly, the aim of the invention is to propose a control circuit that allows for a better monitoring of the multiple signaling and/or lighting functions of a device. Even more particularly, the aim of the invention is to propose a control circuit that allows a better monitoring of the lighting levels with a view to backfitting in line with the regulations. Another aim of the invention is to propose a lighting and/or signaling module which incorporates such a control circuit, a monitoring method and a microcontroller incorporating such a method.

The invention comprises a control circuit for a lighting and/or signaling device, in particular for a vehicle, the device comprising at least two lighting and/or signaling functions each implemented with at least two same light sources of the light-emitting diode type which are passed through by an electric current whose average intensity is different depending on the lighting and/or signaling function, the control circuit comprising an input for a power source for the light sources; a connection of the light sources in series and/or in parallel to the input and to a ground, noteworthy in that it also comprises a unit for monitoring the intensity of the current passing through the light sources, the unit being arranged electrically between the light sources and the power supply input or the ground, and comprising at least one input intended to receive an activation signal for at least one of the lighting and/or signaling functions.

Preferentially, the intensity of the current is controlled by pulse width modulation (PWM).

The lighting and/or signaling functions comprise a first function corresponding to a first average intensity and a second function corresponding to a second average intensity.

According to an advantageous mode of the invention, the monitoring unit comprises a first input for a control signal for a first lighting and/or signaling function and a second input for a control signal for a second lighting and/or signaling function.

According to another advantageous mode of the invention, the light sources are connected in parallel with the monitoring unit so as to form at least two parallel lighting and/or signaling sections for the first and the second functions, such sections being connected separately with the unit, the unit being able to detect a current flow fault in each section, and configured to deactivate all the sections corresponding to a function if a fault in one of the sections is detected.

From a regulatory point of view, the connection of the teaching according to the state of the art described above (U.S. Patent Publication No. 2010/0066249 A1) is considered to be multi-section, on the one hand because of the presence of a number of sections, in this case a number of branches, which are distinct, and on the other hand because of the fact that some branches remain active if one LED fails. By contrast, a single-section signaling device, although it may it comprise a number of light sources, is comparable from an operating point of view to a device with a single light source, namely that all the light sources will necessarily light up at the same time and that not one of them lights up in the case of failure. The regulation for the multi-section signaling devices may be substantially different from that for the single-section devices. Indeed, as an example, the current legislation in the United States of America for rear side lights (FMVSS 108-SAE J585e, "tail lamp") stipulates minimal lighting intensities at different points relative to the device and a maximum intensity, which differ according to the multi-section or single-section nature of the signaling module. In fact, by way of example, the minimum lighting intensity at an angle of 5° in a horizontal plane for a single-section device is 2 cd (candelas) and the maximum intensity (independently of the location of the point where the measurement is made) is 18 cd, whereas the corresponding values for a multi-section module are 5 cd and 25 cd respectively. The American legislation for the brake lights (FMVSS 108-SAE J585e) shows a similar difference between the single-section and multi-section modules.

The fact that a network of LED-type light sources can be likened to a single-section module from a definition point of view according to the regulation gives a certain freedom as to the dimensioning and the differential current modulation for the different lighting and/or signaling functions. In fact, because of the differences in photometric requirements of certain regulations for one and the same lighting function depending on whether the circuit is considered to be single-section or to be multi-section, the technical measures of the invention allow the module greater freedom when it comes to dimensioning (current intensity modulation and resultant photometry).

According to yet another advantageous mode of the invention, the light sources are connected in parallel with the monitoring unit so as to form at least two parallel lighting and/or signaling sections for the first and the second functions, the sections being connected separately with the unit, the unit being able to detect a current flow fault in each section, and configured to, if a fault is detected in one of the sections of one of the functions, keep the remaining section or sections of the function active. In other words, the monitoring unit deactivates only the section of sections corresponding to a function that is/are detected as failing.

According to yet another advantageous mode of the invention, the at least two lighting and/or signaling functions are from among the following functions: rear position lights, brake lights, rear blinker; or from among the following functions: front position lights, front lighting and front blinker.

According to yet another advantageous mode of the invention, the light sources are connected in parallel with the monitoring unit so as to form at least two parallel lighting and/or signaling sections for the first and the second functions, the sections being connected separately with the unit, the unit being able to detect a current flow fault in each section and, if a fault is detected in one of the sections, configured to keep the remaining section or sections active in the presence of the first function and deactivate the sections in the presence of the second function.

According to yet another advantageous mode of the invention, the first lighting and/or signaling function corresponds to a first average intensity, the second lighting and/or signaling functioning corresponds to a second average intensity which is greater, preferably by a factor greater than or equal to 5, even more preferentially to 8, than the first average intensity.

According to yet another advantageous mode of the invention, the first lighting function is a "rear signaling light" function and the second lighting function is a "brake" function.

According to yet another advantageous mode of the invention, the monitoring unit is configured to, when the failure of one of the sections of one of the functions is detected, increase the intensity of the current passing through the other sections of the function so as to at least partially compensate for the loss of lighting.

The invention also comprises a lighting and/or signaling module, in particular for a vehicle, wherein it comprises a control circuit according to the invention defined hereinabove.

The invention also comprises a method for monitoring the light sources of a lighting and/or signaling module, in particular for a vehicle, the module comprising at least two lighting and/or signaling functions each implemented with at least two same light sources passed through by an electric current whose average intensity is different depending on the lighting and/or signaling function, the method being noteworthy in that it comprises the following steps:

a) detection of the presence of at least one activation signal for one of the lighting and/or signaling functions;

b) on the basis of the detection, modulation of the intensity of the current passing through the light sources in order to implement the corresponding lighting function.

According to an advantageous mode of the invention, the method comprises the following additional steps:

c) detection of the failure of the different branches;

d) when the failure of one of the branches is detected in the presence of the first lighting function, maintenance all the remaining branches corresponding to the function.

According to yet another advantageous mode of the invention, the step d) includes increasing the current passing through at least one, preferably all, of the other branches corresponding to the function.

According to another advantageous mode of the invention, the method comprises the following additional step:

e) when the failure of one of the branches is detected in the presence of a second lighting function, deactivation of all the branches corresponding to the function.

The invention also comprises a microcontroller capable of monitoring the intensity of the current passing through the light sources of a lighting and/or signaling module in particular for a vehicle, the module comprising at least two lighting functions each implemented with at least two same light sources passed through by an electric current whose average intensity is different depending on the lighting and/or signaling function, the microcontroller comprising a processor, a memory and at least one interface capable of communicating with a current modulation device, the microcontroller being noteworthy in that it comprises instructions in its memory that conform to the method according to the invention, as defined hereinabove.

Other features and advantages of the present invention will be better understood from the description and the drawings in which:

BRIEF DESCRIPTION OF THE ACCOMPANYING DRAWINGS

FIG. 3 is a logic diagram of a method for monitoring the light sources of a lighting and/or signaling device such as that of FIG. 2, the method conforming to the invention.

DETAILED DESCRIPTION OF THE PREFERRED EMBODIMENTS

Figure 1:
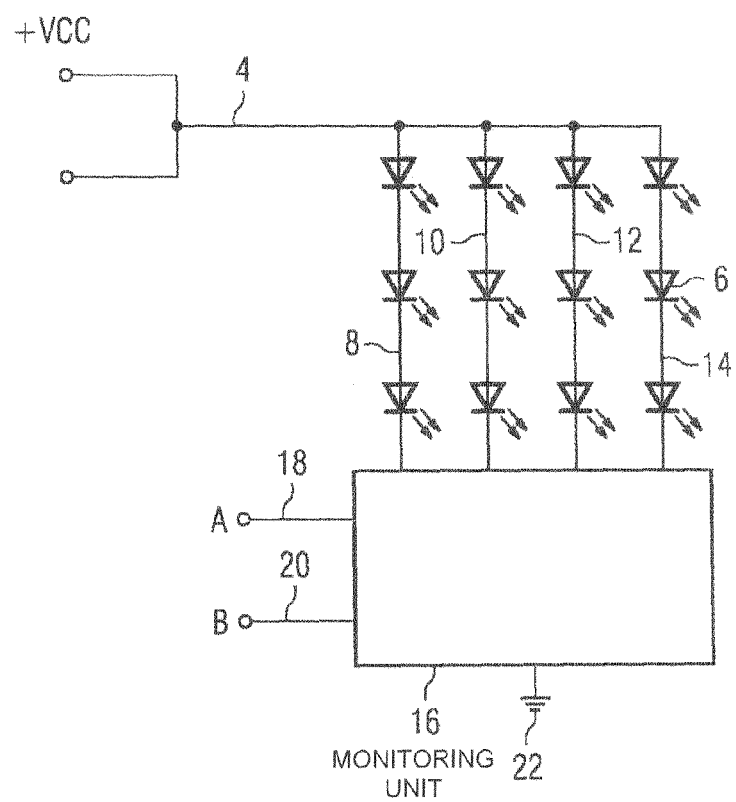
FIG. 1 illustrates the diagram of a control and power supply circuit for a network of LEDs of a signaling module handling two functions using the same LEDs.

A network of light sources of LED type is illustrated in FIG. 1. It comprises four LEDs 6 with identical or similar characteristics arranged on four parallel branches 8, 10, 12 and 14, each branch comprising three LEDs in series. The four branches 8, 10, 12 and 14 are linked to a voltage power supply input 4 onboard the vehicle, such as, for example, a 12 volt DC voltage (VCC) commonly available on a vehicle. This input 4 has two connectors for the two signaling functions A and B of the module. In the case of a power supply circuit for a signaling module, the functions A and B may be, for example from among the following functions: side light (rear position lights), brake light, blinker, reversing light. In the case of a lighting device, the functions A and B may be, for example, from among the following functions: side light (front position lights), low beam, high beam, blinker.

Figure 2:
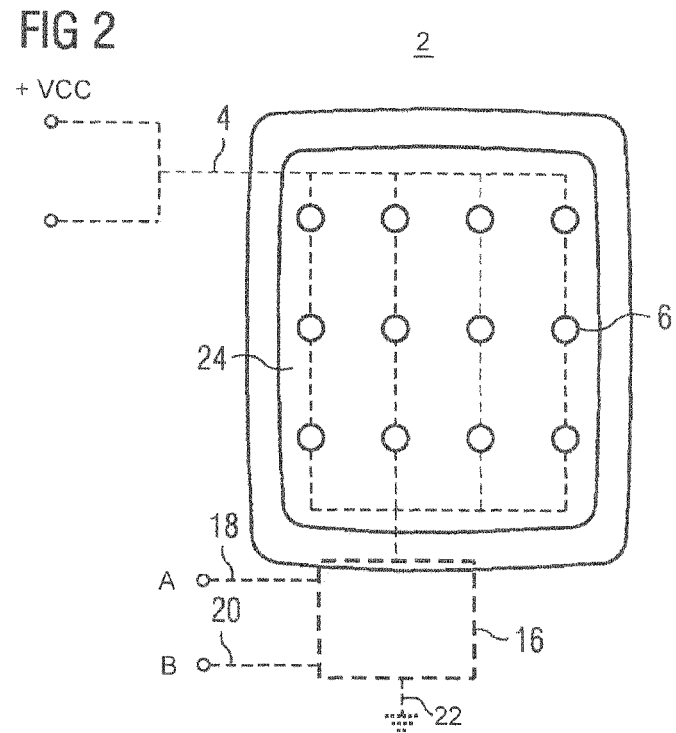
FIG. 2 illustrates a signaling module equipped with a control module according to FIG. 1 and conforming to the invention.

The control circuit 2 which is illustrated in FIG. 2 is intended for a signaling module handling two functions A and B using the same LEDs 6. The function A is a side light function and the function B is a brake light function. In other words, the LEDs 6 will be passed through by a higher current for the function B, or brake light function, so as to visibly differentiate it from the simple side light function A.

The network of LEDs 6 is also linked to a ground 22 of the vehicle where the control circuit 2 is intended to be mounted. Between the network of LEDs 6 and the ground 22 there is a monitoring unit 16. The role of the monitoring unit 16 is to modulate and monitor the current passing through the various branches of LEDs 6 which are arranged in parallel. It should be noted that each branch is connected directly to the monitoring unit so as to be able to monitor each branch separately.

Each signaling function A and/or B is switched on by sending a corresponding signal to the monitoring unit 16. The latter has, by way of example and as illustrated in FIG. 1, two function selection inputs, one input 18 for the function A and one input 20 for the function B. Any other arrangement of input or inputs for control signals, routine for those skilled in the art, is obviously possible.

Driving the LEDs 6 in the current mode is preferable to driving them in voltage mode, in order to control the output light flows on the one hand, and on the other hand to ensure that the current in the LED 6 does not exceed the maximum threshold. The LEDs 6 should be driven in current mode, which means that the electronics of the monitoring unit 16 should be able to set the current which passes through the LEDs 6 in each branch, independently of the number of LEDs 6 connected in series. The preferred driving mode for automobile applications is by pulsed current (PWM).

Figure 4:
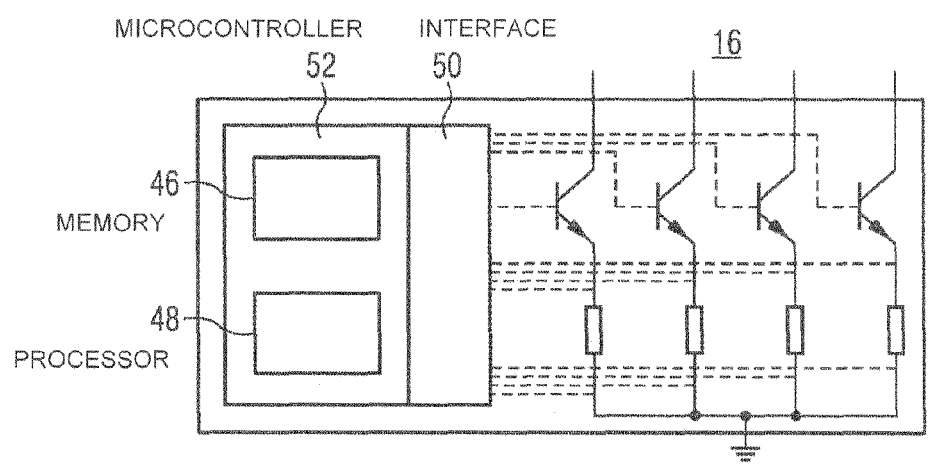
FIG. 4 is a schematic illustration of a monitoring unit of FIGS. 1 and 2 and conforming to the invention.

The monitoring unit 16 can have various architectures, known per se to those skilled in the art, capable of handling the intensity modulation in each branch of the network of LEDs 6. An exemplary architecture is illustrated in FIG. 4. The monitoring unit 16 comprises, for example, a microcontroller 52 and at least one switching means such as a transistor for each branch, the microcontroller 52 controlling the different switching means. The current passing through each branch can, for example, be measured by measuring the voltage of the terminals of a resistor connected specifically to a branch, this analogue measurement then being converted into digital information before being sent to the microcontroller 52. The microcontroller 52 conventionally comprises a memory 46, a processor 48 and an interface 50.

The control circuit 2 may be arranged at various points in the vehicle, in proximity to the lighting and/or signaling module or, equally, remotely therefrom. It may in particular be incorporated in the electrical network of the vehicle. Alternatively, it may also be incorporated in the lighting and/or signaling module or even in the lighting and/or signaling device, the device comprising the module, a housing and possibly other components. FIG. 2 illustrates a signaling module for the side light and brake light functions comprising a control circuit according to that of FIG. 1. The module comprises in particular a reflector 24 and the network of LEDs 6 arranged on the reflector 24. It also comprises the control circuit 2 schematically illustrated in broken lines for reasons of clarity for the explanation.

It should be noted that the network consisting of a series of branches arranged in parallel is purely exemplary. In practice, the branches may take the form of separate circuits possibly describing complex shapes or being nested in one another. The concept of branch can therefore be generalized to the concept of section, being in mind that the different sections of such a network handling at least two lighting and/or signaling functions must be connected in parallel. The branches of the exemplary embodiment of the invention according to FIGS. 1 and 2 are thus particular cases of sections.

The control circuit 2 described above is configured to operate essentially according to the logic illustrated in FIG. 3.

If we first consider the vertical logic sequence on the left, this begins at 26 with the check for the presence of the selection signal for the function A. If the response if positive, that is to say, when the signal A (reference 18 in FIG. 1) is indeed present, the monitoring unit (reference 16 in FIG. 1) then, in 28, modulates the current flowing through each section or branch to a level $I_A$ corresponding to the current which has to pass through each of the LEDs 6 to ensure the signaling performance levels for the function A, namely the side light function. The monitoring unit 16 will then, in 30, measure or at least monitor the current $I_{ASi}$ passing through each section $S_i$, for i ranging from 1 to n, n being the number of sections.

A failure is detected when the current of a section $I_{ASj}$, j being between 1 and n, becomes zero or close to zero. This corresponds to the step 32 in the FIG. 3. In this case, the module is partially defective and, in 34, keeps the other branches at a modulation level I'$_{ASi}$, i ranging from 1 to j−1, j+1 and up to n, greater than the level $I_A$ so as to at least partially compensate the lighting or signaling loss of the defective and out-of-service section. The module handling the side light function A is indeed likened to a multi-section module in that, if one section fails, the others continue to function.

If we now consider the vertical logic sequence on the right in the figure, it can be seen that the first step 36 is a check for the presence of the selection signal for the function B. If this signal is present, the monitoring unit then, in 38, modulates to a level $I_B$ the intensity of the current passing through the different sections 1 to n. The average intensity $I_B$ is greater than the average intensity $I_A$. In fact, the brake light function (B) requires a photometry significantly greater than that of the side light function (A). In the step 40, the current $I_{BSi}$ passing through each section $S_i$ for i ranging from 1 to n, n being the number of sections, is measured or at least monitored by the monitoring unit. In the step 42, a failure is detected when the current of a section $I_{BSj}$, j being between 1 and n, becomes zero or close to zero. In this case, in the next step 44, the current for all the sections is interrupted so as to take the brake light function totally out of service. This action in the event of failure has the effect of making the module react for this function in a way similar to a conventional module with a single light source. In respect of certain regulations, this functionality causes it to be considered to be a single-section module although physically it includes a number of sections. The module must therefore, for this function, meet the photometric requirements of the regulation for a single-section module, these requirements possibly being more favorable for the dimensioning of the module for the two functions.

As it happens, the American regulation FMVSS 108-SAE J586 for a brake light stipulates a minimum light intensity at an angle of 5° in a horizontal plane of 80 cd (candela) for the single-section version and 110 cd for the three-section version. It also stipulates a maximum light intensity at any point of 300 cd for the single-section version and 420 cd for the three-section version. The American regulation FMVSS 108-SAE J585e for a three-section rear position light stipulates a minimum light intensity at an angle of 5° in a horizontal plane of 5 cd and a maximum light intensity at any point of 25 cd. In the case of a signaling module combining the three-section rear position light function and the brake light function, the fact that the brake light function also has three sections would impose an average ratio of the intensities $I_B/I_A$ of the order of 16.8 (420/25). Such a ratio would impose an average current $I_A$ which is very low relative to the average current $I_B$. Such a ratio may pose design problems in particular when it comes to failure detection which might not operate in the event of failure of a section of the rear position light function (A). By having the brake light function operate as a single-section module, the ratio of the intensities $I_B/I_A$ is reduced to a value of the order of 12 (300/25), which is more favorable.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A control circuit for a module for controlling at least two light sources in particular for a vehicle, said module comprising at least two functions (A, B) each implemented with the at least two light sources passed through by an electric current whose average intensity is different depending on said at least two functions (A, B), said control circuit comprising:
   a power supply input for a power source for said at least two light sources;
   a connection of said at least two light sources in parallel to said power supply input and to a ground; and
   a monitoring unit for monitoring the intensity of the current passing through said at least two light sources, said monitoring unit being arranged electrically between said at least two light sources and said ground;
   wherein said at least two functions (A,B) each comprises a light function or a signaling function;
   wherein said monitoring unit comprises a first input for a control signal for the first function (A) and a second input for a control signal for the second function (B);
   wherein said at least two light sources are connected with said monitoring unit so as to form at least two parallel sections for the first and the second functions (A,B), said at least two parallel sections being connected separately with said monitoring unit, said monitoring unit being able to detect a current flow fault in each section and, if a fault is detected in one of said at least two parallel sections during the first function, configured to keep the remaining section or sections active in the presence of said first function and if the fault is detected in one of said at least two parallel sections during the second function, configured to deactivate all the remaining sections in the presence of said second function.

2. The control circuit according to claim 1, wherein said at least two light sources are light-emitting diodes.

3. The control circuit according to claim 1, wherein said at least two light sources are connected in parallel with said monitoring unit so as to form said at least two parallel sections for the first and the second functions (A, B), said at least two parallel sections being connected separately with said monitoring unit, said monitoring unit being able to detect a current flow fault in each of said at least two parallel sections, and configured, if a fault is detected in one of said at least two parallel sections, to keep the remaining section or sections corresponding to said first or said second function active.

4. The control circuit according to claim 1, wherein said at least two functions (A, B) are from among the following functions: rear position lights, brake lights, and rear blinker.

5. The control circuit according to claim 4, wherein the first function (A) is a "rear position light" function and the second function (B) is a "brake" function.

6. The control circuit according to claim 1, wherein said first function (A) corresponds to a first average intensity (IA), said second function (B) corresponds to a second average intensity (IB) which is greater, preferably by a factor greater than or equal to 5, than said first average intensity.

7. The control circuit according to claim 1, wherein said monitoring unit is configured to, when the failure of one of said at least two parallel sections of one of said first and second functions (A) is detected, increase the intensity of the current (I'AS) passing through the other sections of said at least two parallel sections so as to at least partially compensate for the loss of lighting.

8. The control circuit according to claim 1, wherein said monitoring unit further comprises a microcontroller having a memory for storing operation instructions; said microcontroller is configured for monitoring the intensity of the current passing through said at least two light sources; wherein said microcontroller further comprises a processor and at least one interface for communicating with a current modulation device.

9. The control circuit according to claim 1, wherein said at least two functions (A, B) are from among the following functions: front position lights, front lighting, and front blinker.

10. A method for monitoring light sources of a module in particular for controlling at least two light sources in a vehicle, said module comprising at least two functions (A. B) each implemented with said at least two light sources passed through by an electric current whose average intensity is different depending on said at least two functions, said method comprising the following steps:
 a) detecting the presence of at least one activation signal for one of said at least two functions;
 b) using pulse width modulation to modulate an intensity of the current passing through said at least two light sources in response to said detection and in order to implement a corresponding function;
 wherein said at least two functions (A, B) each comprises a light function or a signaling function;
 c) detecting said at least two light sources if any failure occurs;
 d) wherein said at least two light sources being connected to a monitoring unit so as to form at least two parallel sections for the first and second functions; said at least two parallel sections being connected separately with said monitoring unit; said monitoring unit being employed to detect said failure; if said failure is detected in one of said at least two parallel sections during the first function, keeping the remaining section or sections active in the presence of said first function, and if said failure is detected in one of said at least two parallel sections during the second function then deactivating all the remaining sections in the presence of said second function.

11. The monitoring method according to claim 10, wherein said method further comprising increasing the current passing through at least one of the non-failed light sources.

12. The monitoring method according to claim 11, wherein when the failure of one of said at least two parallel sections is detected, increasing the intensity of the current (I'AS) passing through the other sections of said at least two parallel sections so as to at least partially compensate for the loss of lighting.

13. The monitoring method according to claim 10, wherein when the failure of one of said at least two parallel sections is detected, increasing the intensity of the current (I'AS) passing through the other sections of said at least two parallel sections so as to at least partially compensate for the loss of lighting.

* * * * *